(12) United States Patent
Bueble

(10) Patent No.: US 11,608,293 B2
(45) Date of Patent: Mar. 21, 2023

(54) METHOD FOR THE PRODUCTION OF PORTLAND CEMENT COMPOSITION WITH LOW EMBODIED ENERGY AND CARBON FOR ABRASION RESISTANT CONCRETE AND MORTAR

(71) Applicant: Richard Bueble, Calgary (CA)

(72) Inventor: Richard Bueble, Calgary (CA)

(*) Notice: Subject to any disclaimer, the term of this patent is extended or adjusted under 35 U.S.C. 154(b) by 125 days.

(21) Appl. No.: 16/830,984

(22) Filed: Mar. 26, 2020

(65) Prior Publication Data

US 2020/0317568 A1    Oct. 8, 2020

Related U.S. Application Data

(60) Provisional application No. 62/829,255, filed on Apr. 4, 2019.

(51) Int. Cl.
| | | |
|---|---|---|
| *C04B 7/02* | (2006.01) | |
| *C04B 14/36* | (2006.01) | |
| *C04B 7/48* | (2006.01) | |

(52) U.S. Cl.
CPC ............ *C04B 7/02* (2013.01); *C04B 7/48* (2013.01); *C04B 14/365* (2013.01)

(58) Field of Classification Search
CPC .. C04B 7/02; C04B 7/48; C04B 14/06; C04B 14/365; C04B 24/2647; C04B 28/04; C04B 2103/0043; C04B 2103/0044
See application file for complete search history.

(56) References Cited

U.S. PATENT DOCUMENTS 4,507,154 A  *  3/1985   Burge .................. C04B 14/303
                                                          106/805
2004/0089203 A1*  5/2004   Ronin .................... C04B 7/527
                                                          106/737

FOREIGN PATENT DOCUMENTS

| CN | 101844901 A | * | 9/2010 | ............ C04B 14/06 |
| CN | 104761162 A | * | 7/2015 | |
| CN | 105669219 A | * | 6/2016 | |
| CN | 107721212 A | * | 2/2018 | |
| CN | 108609947 A | * | 10/2018 | |
| CN | 109095859 A | * | 12/2018 | |
| CN | 109279847 A | * | 1/2019 | |
| CN | 109437766 A | * | 3/2019 | ............ C04B 28/04 |
| KR | 10-0622567 B1 | * | 9/2006 | |

* cited by examiner

*Primary Examiner* — Anthony J Green
(74) *Attorney, Agent, or Firm* — Ryan W. Dupuis; Kyle R. Satterthwaite; Ade & Company Inc.

(57) ABSTRACT

Portland cement has high embodied energy and embodied carbon associated with its manufacture. In many construction applications, the need for concrete and mortar abrasion resistance requires the consumption of significantly higher amounts of Portland cement for higher concrete and mortar compressive strength. The invention comprises a new method for producing a chemically inert, low embodied energy and carbon mineral additive, with specific hardness and particle size, during Portland cement manufacturing that replaces a significant portion of the Portland cement by mass in the final composition. Alternatively, the mineral additive is produced separately and combined with Portland cement. The resulting mineral additive Portland cement composition has significantly lower embodied energy and carbon and imparts significantly higher abrasion resistance to concrete and mortar.

17 Claims, 10 Drawing Sheets

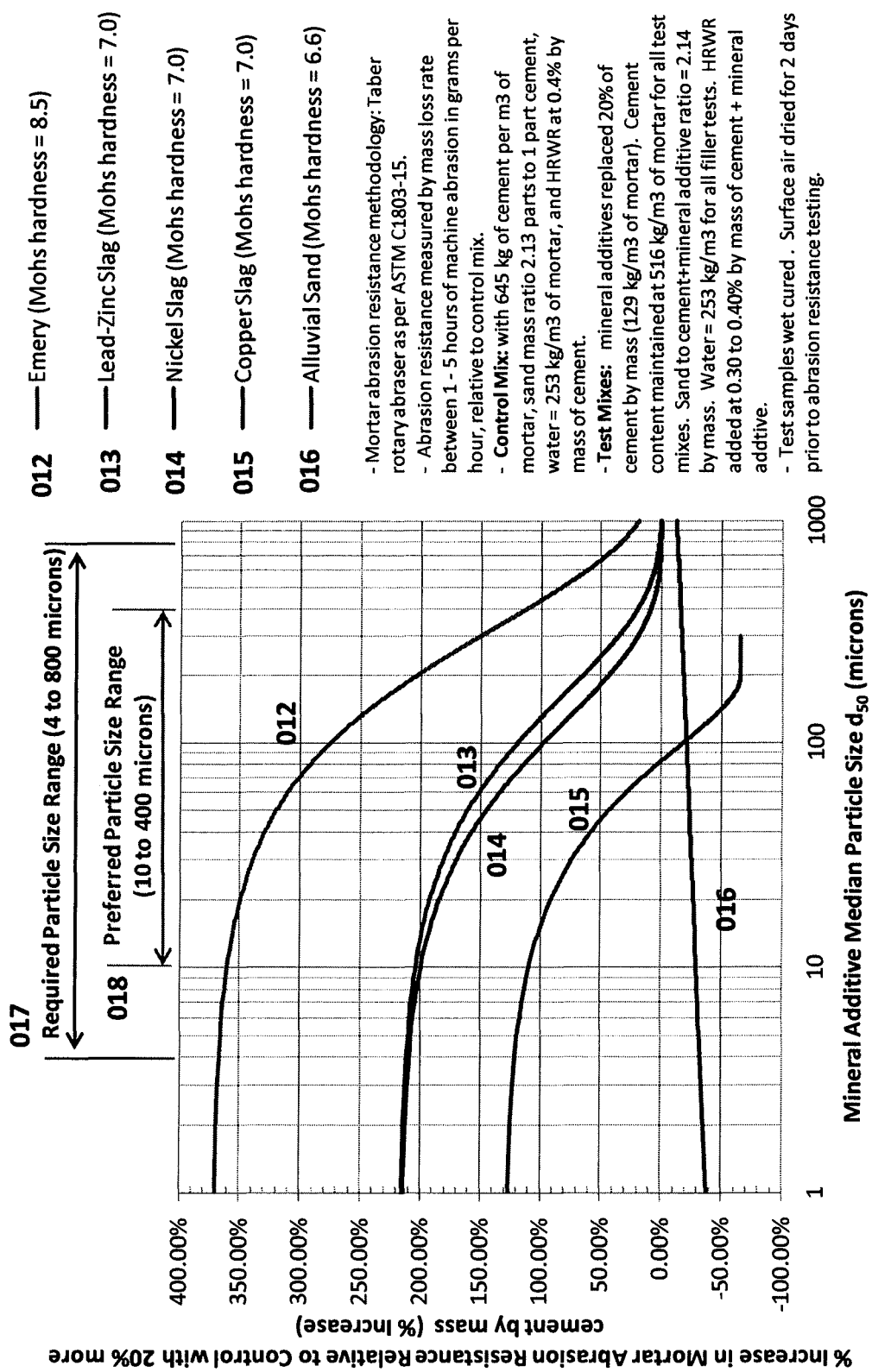

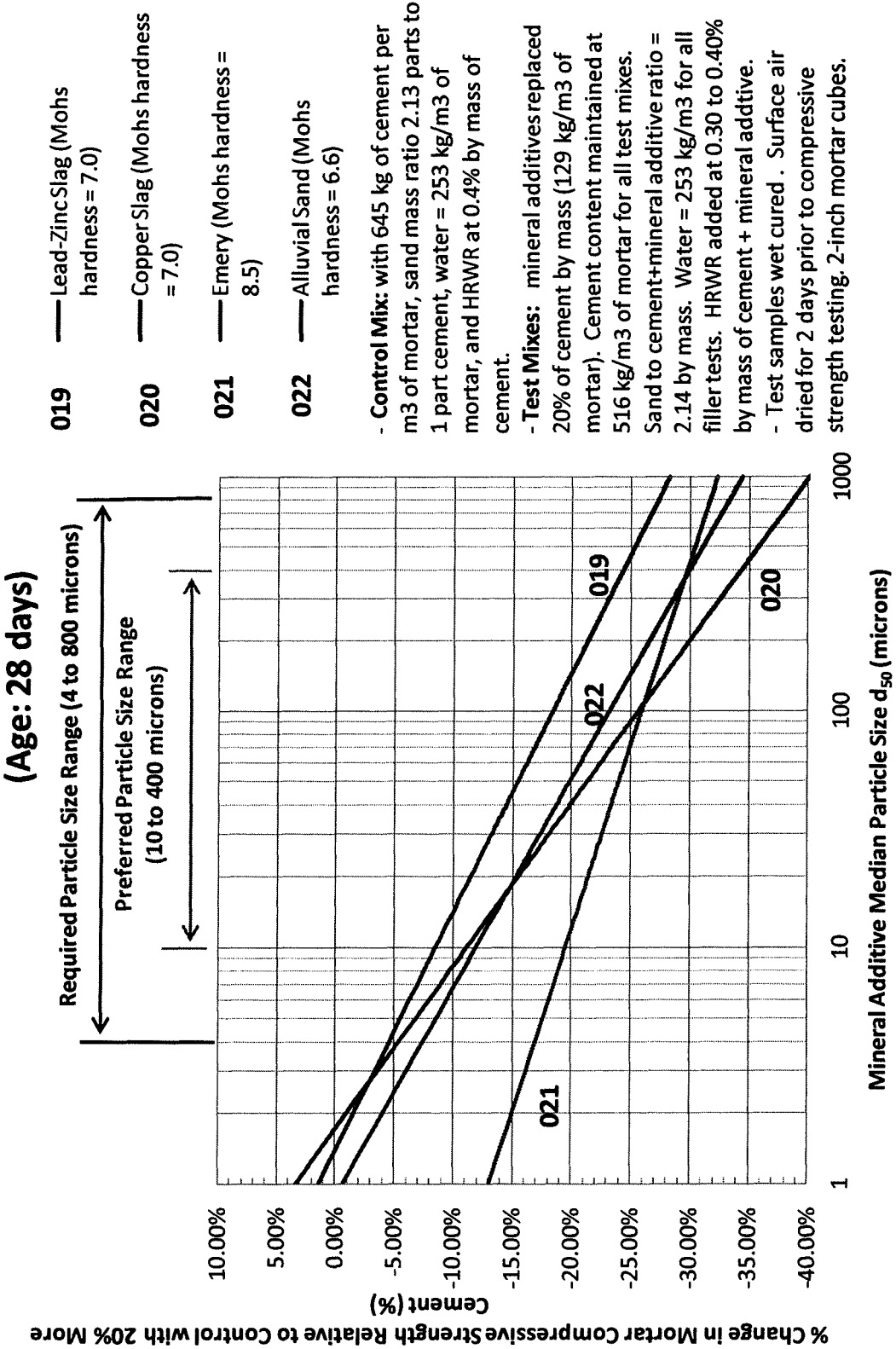
FIG. 3: Compressive Strength of Mortar with Mineral Additive Relative to Control with No Mineral Additive - 20% Cement Replaced by Mass (Age: 28 days)

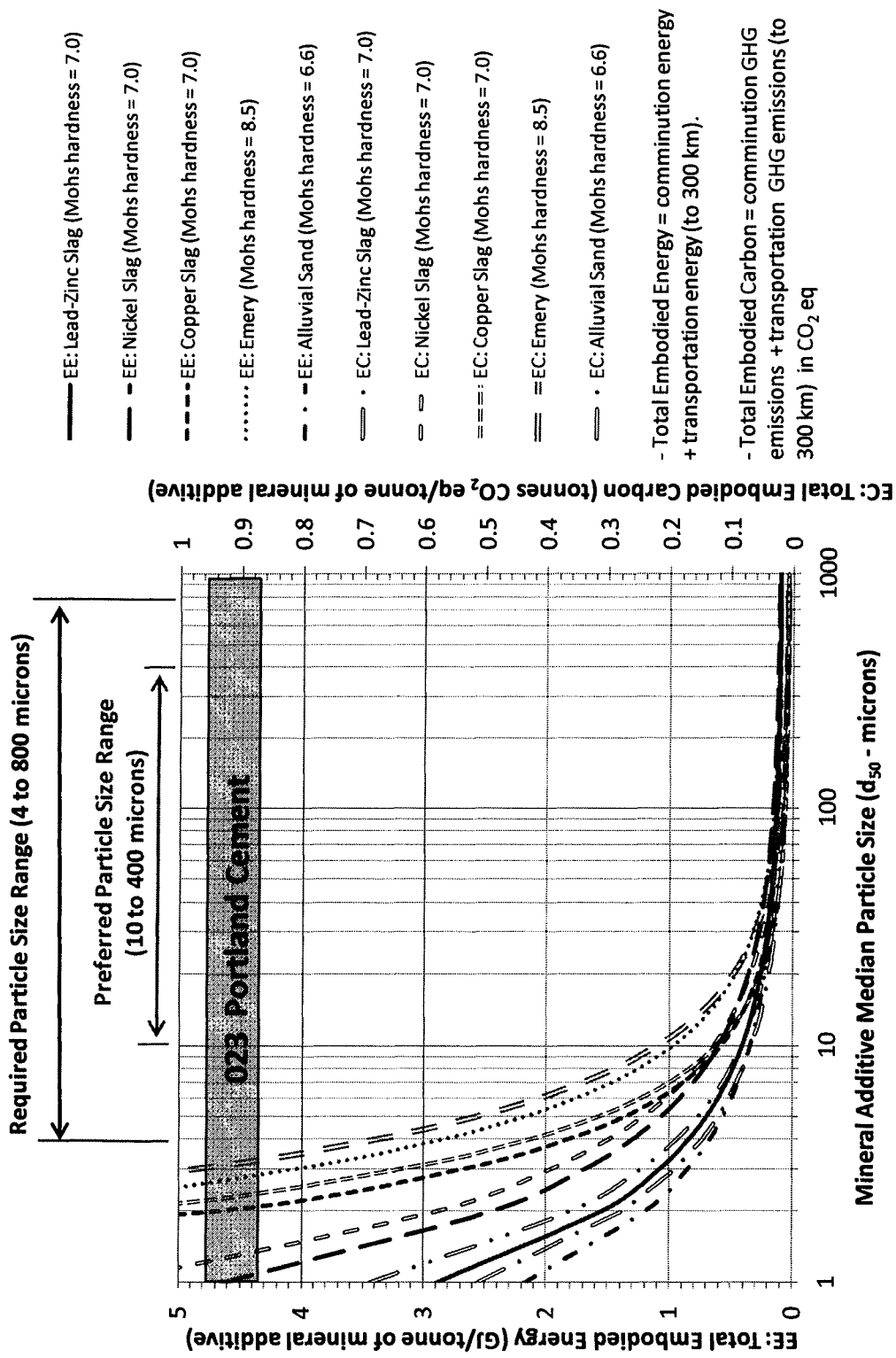
FIG. 4: Embodied Energy & Carbon of Mineral Additives Versus Median Particle Size Relative to Portland Cement

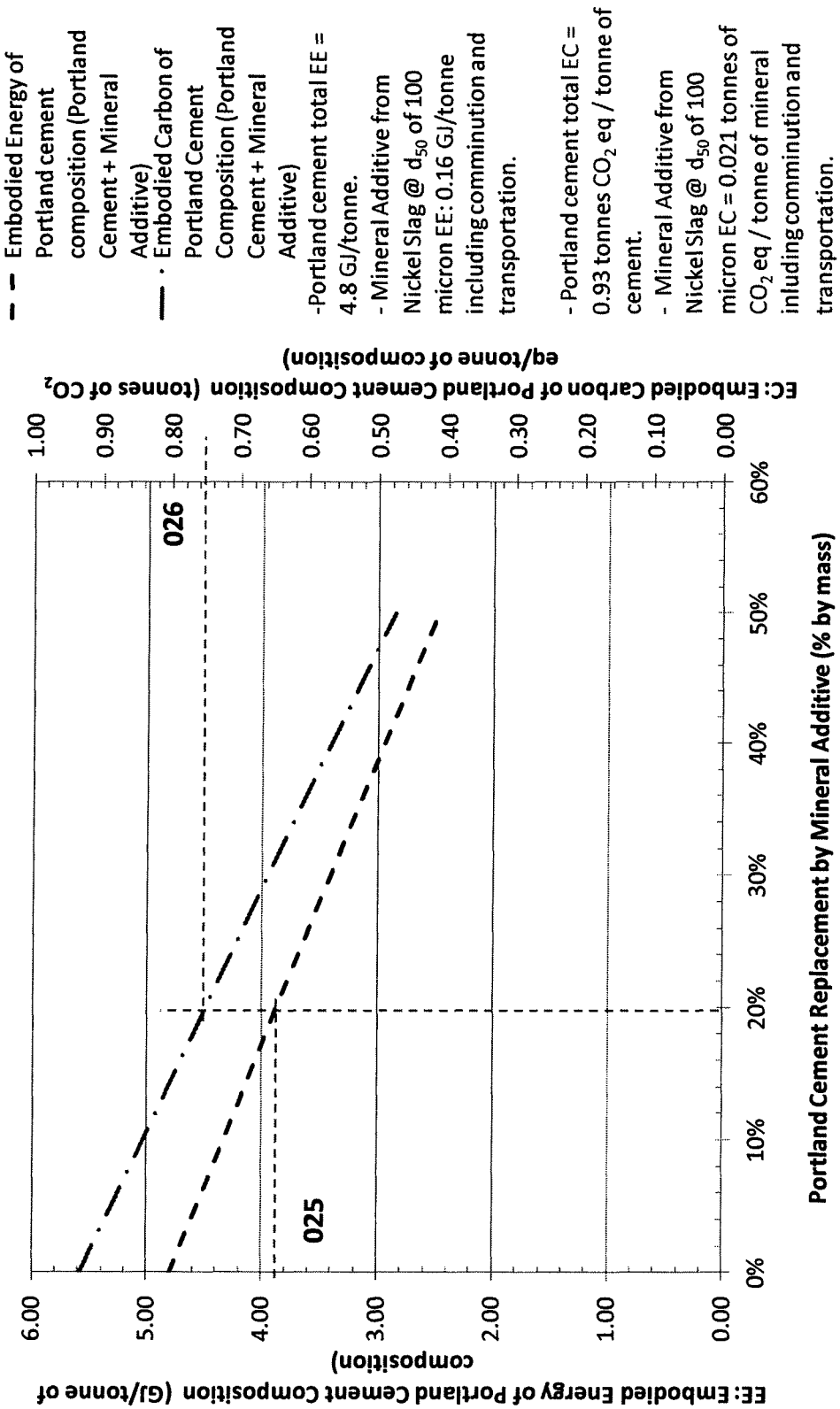

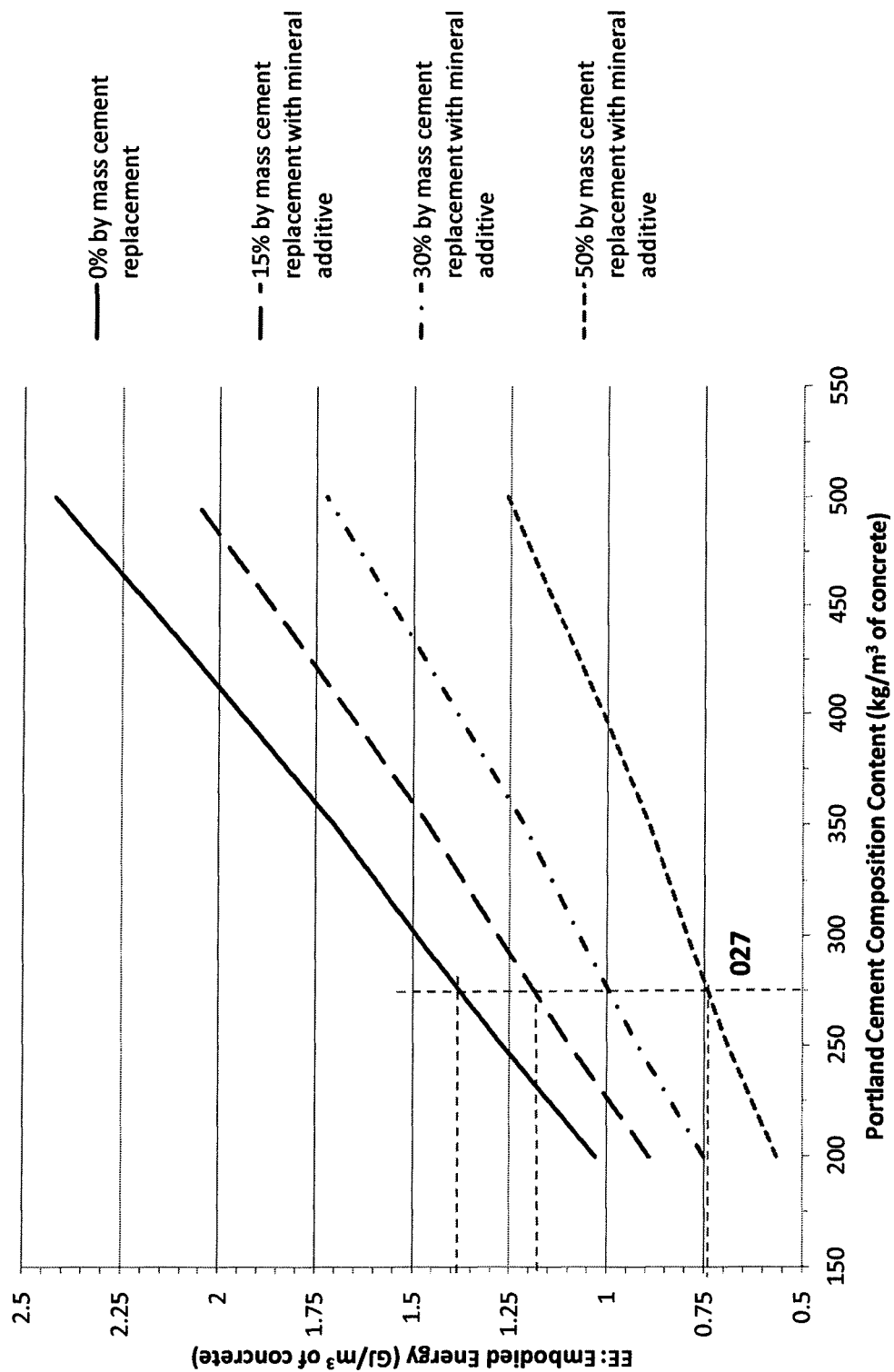
FIG. 6: Embodied Energy of Concrete Made with Portland Cement Composition with Nickel Slag Mineral Additive Comminuted to $d_{50} = 100$ microns

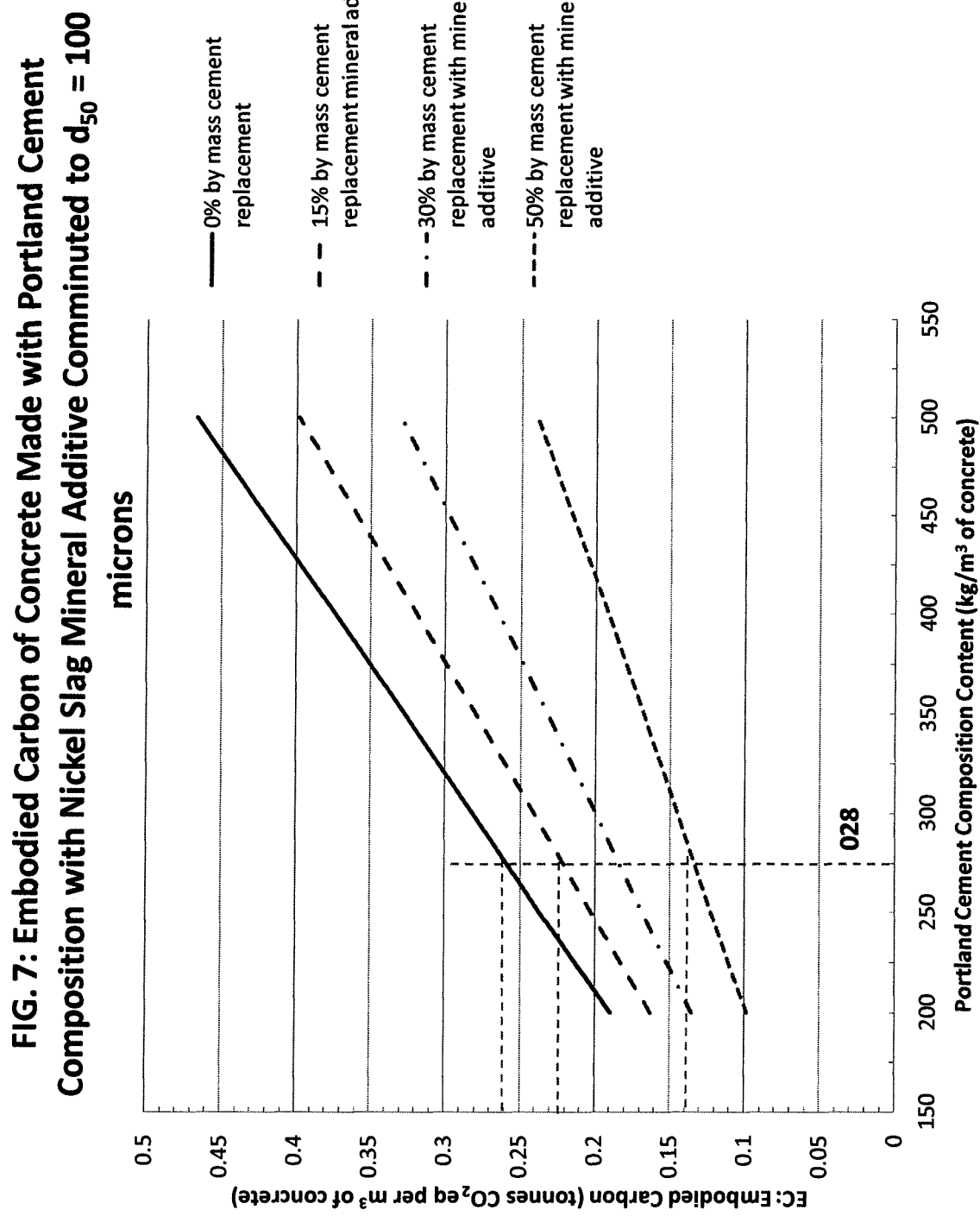

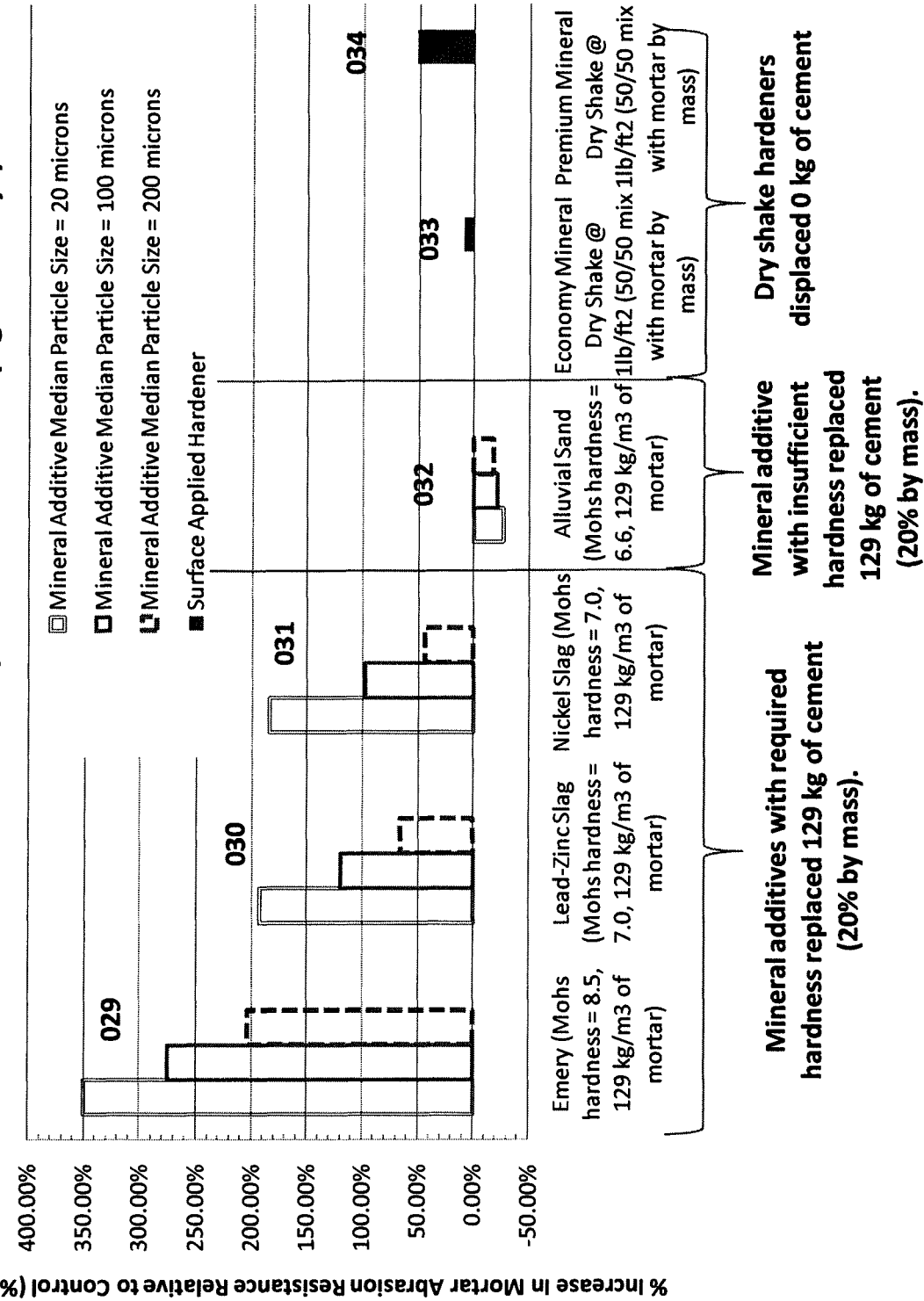

METHOD FOR THE PRODUCTION OF PORTLAND CEMENT COMPOSITION WITH LOW EMBODIED ENERGY AND CARBON FOR ABRASION RESISTANT CONCRETE AND MORTAR

This application claims the benefit under 35 U.S.C. 119(e) of U.S. provisional application Ser. No. 62/829,255, filed Apr. 4, 2019.

FIELD OF THE INVENTION

The invention generally relates to the field of Portland cement, concrete and mortar, and more specifically, Portland cement with reduced energy consumption and greenhouse gas emissions associated with its manufacture and its use in concrete and mortar requiring increased resistance to wear from abrasion.

BACKGROUND

Portland Cement and Concrete Industries

Concrete is the most consumed manufactured material on earth. Globally, on the order of 30 billion tonnes of concrete is consumed annually, which is more than all other construction materials combined as noted in [WBCSD, "The Cement Sustainability Initative: Recycling Concrete Executive Summary," World Business Council on Sustainable Development, Geneva, Switzerland, 2009.]. Portland cement is the essential binder used in the manufacture of concrete, which is a composite material containing at minimum, fine aggregate (sand), coarse aggregate (gravel) and water, in addition to Portland cement. Globally, on the order of 4.6 billion tonnes of Portland cement is produced per year and more than 90% of Portland cement is consumed by concrete manufacturing according to [Cembureau, "Activity Report 2017," The European Cement Association, Brussels, 2017] and [S. Kosmatka and M. Wilson, "Chapter 1," in *The Design and Control of Concrete Mixtures* 16th Edition, The Portland Cement Association, 2016]. Other cementitious products utilizing Portland cement include mortar, which is similar to concrete but does not contain coarse aggregate. The term mortar also refers to the mixture of cement, sand and water that binds the coarse aggregate together in concrete. The US and Canada are the fourth and twelfth largest Portland cement producer nations, respectively [Cembureau, "Activity Report 2017," The European Cement Association, Brussels, 2017].

Portland Cement Enemy Consumption and GHG Emissions

Portland cement manufacturing is highly energy intensive with significant greenhouse gas (GHG) emissions due to the large amount of thermal fossil fuel and energy required to manufacture clinker (an essential intermediate material in the manufacture of Portland cement) and chemical by-product carbon dioxide ($CO_2$) released during clinker manufacturing. Globally, approximately, one third of Portland cement GHG emissions is attributable to thermal fuel combustion and two thirds of greenhouse gas emissions is a chemical by-product emitted from the decarbonization of limestone (called calcination) during clinker manufacturing according to [IEA CSI, "Technology Roadmap: Low Carbon Transition in the Cement Industry," International Energy Agency, 2018]. Clinker is then ground (reduced in particle size to a fine powder) with approximately 4 to 5% gypsum by mass to form the final, conventional Portland cement composition. Portland cement manufacturing has significant impact on global, US and Canadian energy consumption, GHG emissions and the environment.

Embodied energy is the total amount of energy (electrical, fuel, heat, etc) consumed in the manufacture of a material or final product from raw material to finished goods per unit mass of the material or final product. Embodied carbon is the total amount GHGs emitted (from electricity production, fuel combustion, process emission, etc) in the manufacture of a material or final product per unit mass according to [P. Domone and J. Illston, Construction Materials: Their Nature and Behaviour 4th Edition, New York, N.Y.: Spon Press, 2010]. The embodied energy of Portland cement is on the order of 4.6 to 4.8 GJ per tonne and its embodied carbon is on the order of 0.88 to 0.97 tonnes $CO_2$ eq per tonne of Portland cement according to [G. Hammond and C. Jones, "Inventory of Carbon and Energy (ICE) Version 1.6a," University of Bath, Bath, United Kingdom, 2008] and [M. Marceau, M. Nisbet and M. VanGeem, "Life Cyle Inventory of Portland Cement Manufacture," Portland Cement Association, Skokie, Ill., 2006]. According to the Intergovernmental Panel on Climate Change, $CO_2$ eq (equivalent) is the sum of all types of GHG emissions expressed as a weighted average of the GHG volume and its Global Warming Potential factor according to [IPCC, "Intergovernmental Panel on Climate Change Fourth Assessment Report," Intergovernmental Panel on Climate Change, 2007]. Clinker manufacturing accounts for 95% of Portland cement's embodied energy and carbon according to [M. Marceau, M. Nisbet and M. VanGeem, "Life Cyle Inventory of Portland Cement Manufacture," Portland Cement Association, Skokie, Ill., 2006]. Portland cement accounts for on the order of 88% and 95% of concrete's embodied energy and embodied carbon, respectively according to [M. Marceau, M. Nisbet and M. VanGeem, "Life Cycle Inventory of Portland Cement Concrete," Portland Cement Association, Skokie, Ill., 2007].

On a global scale, Portland cement manufacturing is the third largest industrial energy consumer and accounts for approximately 7% of all global industrial energy consumption. The global Portland cement industry accounts for approximately 7% of anthropogenic $CO_2$ emissions and is the second largest industrial emitter of $CO_2$. according to [IEA CSI, "Technology Roadmap: Low Carbon Transition in the Cement Industry," International Energy Agency, 2018]. The global, US and Canadian cement industries are facing significant regulatory and public pressure to reduce energy consumption and GHG emissions. For example, 2019 is the first year of Canada's Federal carbon pricing policy, which directly affects the domestic Portland cement industry as a large GHG emitter and imposes significant costs on clinker production according to [G. o. Canada, "Canada Gazette," 2018. [Online]. Available: http://www-.gazette.gc.ca/rp-pr/p2/2018/2018-10-31/html/sor-dors212-eng.html, Accessed 12 Dec. 2018].

Concrete Abrasion & Erosion

Abrasion is the destructive, progressive wearing of concrete by mechanical or fluid action over time, starting at the outermost concrete surface. Abrasion induced by fluid action, most notably running water carrying sediment, is referred to as abrasion-erosion.

According to the American Concrete Institute: "Abrasion resistance of concrete is defined as the ability of a surface to resist being worn away by rubbing and friction" according to [ACI, *ACI 201.2R-0: Guide to Durable Concrete*, American Concrete Institute, 2001]. Abrasion resistance of concrete is essential in many applications such as buildings and transportation, commercial, industrial, utility and institutional concrete infrastructure. Abrasion resistance greatly determines the service life of concrete in many applications and is considered by concrete engineering experts to be the most important mechanical property determining concrete durability in general according to [M. Alexander, A. Bentur and S. Mindess, "Durability of Concrete," CRC Press, Taylor & Francis Group, Boca Raton, Fla., 2017].

Abrasion resistance of concrete is most commonly increased, to a limited extent, by overdesigning the compressive strength with excess Portland cement, not required for structural engineering or structural safety purposes. The overdesign of compressive strength for abrasion resistance greatly increases the embodied carbon and energy of concrete and consumes substantially more Portland cement and, by extension, clinker. Additionally, premature replacement of concrete worn out due to abrasion or erosion, requires more Portland cement, and by extension clinker, be produced and consumed again in the replacement concrete.

Relevant Materials & Processes

Minerals are metallic or non-metallic, inorganic compounds not consumed for fuel purposes. Inorganic compounds do not contain carbon chemically bonded to hydrogen according to [Encyclopedia Britannica, "Inorganic Compound," 11 Feb. 2019. (Online). Available: https://www.britannica.com/science/inorganic-compound. (Accessed 2019)]. Minerals are mined from natural, geological formations (such as sand, ore, rock, clays, etc), produced as by-products or co-products of industrial processes (such as slags, ashes, fumes etc) or synthetically manufactured (such as fused aluminum oxide, silicon carbide, etc).

In materials engineering, abrasion resistance of a material is a function and outcome of the hardness of the material. Hardness is a measure of a material's resistance to an indentation deformation or scratching by another impinging material according to [K. Hermann, Hardness Testing: Principles and Applications, Materials Park, Ohio: ASM International, 2011]. Mohs hardness is a scratch resistance test to measure the hardness of minerals on a relative scale (Mohs hardness scale.) Talc and diamond are relatively soft and hard minerals with Mohs hardness of 1 and 10, respectively.

In minerals processing, comminution is the science and practice of solid particle size reduction and most typically entails crushing and/or grinding of minerals on a dry or wet basis. Comminution is an energy intensive process requiring significant amounts of primarily electrical energy to power crushing and grinding machines, such as for example jaw crushers, cone crushers, gyratory crushers, hammermills, high pressure grinding rolls, rod mills, ball mills, vibratory mills, stirred mills and others.

DESCRIPTION OF THE RELATED ART

Portland Cement Embodied Enemy & Carbon Reduction

Two of the most important conventional ways to reduce the embodied energy and carbon of Portland cement includes:

Clinker Substitution: minerals with lower embodied energy and carbon are added to the clinker, replacing some of the clinker mass, before it is ground (comminuted) into the finished Portland cement product, while attempting to maintain the regulated performance and quality of the finished Portland cement product.

Portland Cement Replacement: is the indirect, implicit reduction of clinker consumption by partial replacement of some of the Portland cement mass with minerals of lower embodied energy and carbon, in the final cement composition or the concrete or mortar itself.

Currently, total global clinker substitution is on the order of 26% by mass of Portland cement and is expected to grow to 35% and 40% by 2030 and 2050, respectively according to [IEA CSI, "Technology Roadmap: Low Carbon Transition in the Cement Industry," International Energy Agency, 2018] and [LafargeHolcim Annual Report, "Building for Growth: 2017 Annual Report," LafargeHolcim, 2017].

Concrete & Mortar Abrasion Resistance

There are three conventional techniques utilized to increase concrete and mortar abrasion resistance:

Increased Concrete Compressive Strength: There is a correlation between concrete and mortar compressive strength and abrasion resistance. Increased Portland cement content is fundamental to significantly increased concrete and mortar compressive strength (discussed further below). Over 90% of projects requiring concrete and mortar abrasion resistance utilize increased Portland cement content and compressive strength.

Surface Applied Hardeners: There are two main families of surface hardeners: dry shake and liquid. Dry shake hardeners are solid, specialty, proprietary, mineral or metal based products applied to the surface of concrete by a contractor during the construction process in some limited, specialty applications and projects. Liquid hardeners are proprietary products typically based on aqueous sodium, lithium or potassium silicates. Surface applied dry shake hardeners do not affect bulk concrete compressive strength and instead rely on embedding mineral or metal coarse fragments (approximately 1 to 5 mm in particle size) into the concrete surface to increase the concrete surface abrasion resistance to some limited degree. Liquid hardeners usually react with by-products of Portland cement hydration and densify the concrete surface to some limited degree, by filling in some concrete pores.

Integral Hardeners: specialty, proprietary, mineral based products mixed directly into concrete or mortar at the time of concrete manufacturing in some limited, specialty applications and projects.

Portland Cement, SCMs & Compressive Strength of Concrete and Mortar

Calcium-silicate-hydrate (CSH) gel is the solid binder that provides concrete and mortar with its compressive strength. The amount and quality of CSH gel is fundamental to concrete and mortar compressive strength development. In order to increase the compressive strength of concrete and mortar, more of the CSH gel binder must be chemically formed in the material matrix. There are two types of chemically reactive materials that can add additional CSH gel to concrete and mortar:

Hydraulic Cement: Portland cement is a hydraulic cement meaning it undergoes a chemical hydration reaction with water over hours, days, weeks and months to form CSH gel. The addition of more Portland cement to concrete proportionally increases the amount of CSH gel formed, which directly increases the compressive strength of the concrete and mortar.

Pozzolanic Materials: as a by-product of Portland cement hydration over time, calcium hydroxide (Portlandite) is formed as weak, coarse discrete inclusions throughout the continuous CSH binder phase. In the presence of water, pozzolanic materials (or pozzolans) chemically consume some calcium hydroxide by-product and form some additional CSH gel in its place. Pozzolanic materials cannot directly form CSH gel with water on their own like hydraulic cement. Instead pozzolanic materials can only indirectly add some, limited amount of additional CSH gel over weeks, months and years.

Conventional supplementary cementing materials (SCMs) are either pozzolanic, somewhat hydraulic or both. SCMs are conventionally used to replace some limited amount of Portland cement by mass, while maintaining, or perhaps increasing to some limited extent, compressive strength of concrete and mortar. The most commonly used SCMs are fly ash (a mineral by-product of coal combustion), ferrous blast furnace slag (a mineral by-product of iron production) and silica fume (a mineral by-product of silicon and silicon alloy production.) Slag cements are most typically produced with a combination of ferrous ground granulated blast furnace slag SCM and Portland cement.

From the abrasion resistance perspective, in any case, Portland cement and all conventional SCMs are chemically reactive and eventually chemically converted into CSH gel, with the same hardness and abrasion resistance, in concrete and mortar.

Deficiency of the Related Art

Conventional Clinker Substitution & Cement Replacement Deficiencies

Conventional clinker substitution minerals do not increase, and in many cases decrease, the abrasion resistance of Portland cement, concrete and mortar. For example, in Portland limestone cement, limestone (with a Mohs hardness of approximately 3.0), is sometimes substituted for clinker up to approximately 10% by mass. The amount of limestone in the final cement composition must be limited, in part, to mitigate excessive reduction in cement, concrete and mortar abrasion resistance according to [D. Hooton and M. Nokken, "Portland-Limestone Cement: State-of-the-Art Report and Gap Analysis for CSA A3000," 2007].

Conventional SCMs are used to replace some limited amount of Portland cement in cement, concrete or mortar. In general, the use of SCMs is known to have no significant effect on concrete abrasion resistance beyond their effect on compressive strength according to [M. Kosmatka and M. Wilson, Design and Control of Concrete Mixtures: the guide to applications, methods and materials; 15th edition, Skokie, Ill.: Portland Cement Association, 2011]. In fact, the use of fly ash and ferrous blast furnace slag have been shown to reduce the abrasion resistance of concrete according to [T. Naik, S. Singh and M. Hossain, "Abrasion Resistance of High Strength Concrete Made with Class C Fly Ash," *ACI Materials Journal*, p. 649 to 659, November December 1995], [A. Sehn, "Evaluation of Portland Cement Concretes Containing Ground Granulated Blast Furnace Slag," University of Akron, Akron, Ohio, 2002], and [L. Fernandez and V. Malhotra, "Mechanical Properties, Abrasion Resistance, and Chloride Permeability of Concrete Incorporating Blast-Furnace Slag," *Cement, Concrete and Aggregates*, Vol. 12, No. 2 Winter 1990, p. 87 to 100, 1990].

In abrasion resistant concrete and mortar applications, conventional clinker substitution or cement replacement provides limited to no significant improvement in abrasion resistance and in many cases reduces abrasion resistance. Consequently, the use of conventional clinker substitutes or SCMs in abrasion resistant concrete and mortar applications is either: limited and requires the Portland cement content be substantially increased or unsuitable altogether. Conventional clinker substitutes and SCMs do not significantly reduce Portland cement, concrete or mortar embodied energy and carbon in construction applications requiring abrasion resistance.

Increased Cement Content for Concrete Abrasion Resistance Deficiencies

Approximately 100 years of concrete research and practical experience in the use of increased Portland cement content in concrete and mortar has demonstrated the following according to [D. Abrams, "Wear Tests of Concrete," *ASTM Proceedings*, Vol. 21., p. 1013 to 1038, 1921], [Backstrom and Witte, "Some Properties Affecting the Wear Resistance of Air-Entrained Concrete," *ASTM Proceedings*, p. 1141 to 1155, 1951], [T. Liu, "Abrasion Resistance of Concrete," *ACI Journal, pp.* 341-350, September October 1981], and [R. Dhir, P. Hewlett and Y. Chan, "Near Surface Characteristics of Concrete: Abrasion Resistance," *Materials and Structures*, p. 122 to 128, 1991]:

Substantial Increase in Cement Content (higher embodied energy and carbon): Concrete with 25 MPa (3,625 psi) compressive strength at 28 days is commonly used in high surface area concrete flatwork applications (i.e.: building floors). On the order of 75% more cement by mass is required to approximately double the 28 day compressive strength to 50 MPa (7,250 psi). The substantial increase in cement content consumes much more clinker and proportionally increases the concrete embodied energy and carbon.

Limited Abrasion Resistance Performance: on the order of 85% increase in concrete abrasion resistance may be attained by increasing concrete compressive strength from on the order of 25 to 50 MPa, with on the order of 75% more Portland cement.

Diminishing Abrasion Resistance Performance: At approximately 50 to 55 MPa compressive strength, additional Portland cement addition results in significantly diminishing returns to compressive strength and abrasion resistance.

Problematic Secondary Effects: Significant increase in Portland cement content is also accompanied by problematic effects including: higher cost, significantly increased propensity for concrete cracking (shrinkage and thermal), constructability problems (warping, dishing, curling and joint widening in concrete flatwork) and constructability and quality challenges (sticky, rapid setting mixes difficult to pump, place, finish and cure) during construction.

Surface Hardener Deficiencies

Surface applied hardeners suffer from the following limitations and deficiencies:

Embodied Energy and Carbon: surface applied hardeners do not reduce the Portland cement content of concrete and do not conserve clinker.

Limited Performance: surface hardeners have limited capacity to increase concrete abrasion resistance and are only contained in the extreme outermost concrete surface (on the order of 2-5 mm depth). Once abrasion wears through the surface hardener, the concrete is unprotected from further wear.

Incompatibility: dry shake hardeners cannot generally be applied to concrete exposed to freeze-thaw conditions (air entrained concrete) according to [E. C. Company, *Dry Shake Floor Hardeners Installation Instructions*, Euclid Chemical Company, 2019], which includes virtually all exterior concrete in Canada and the majority of exterior concrete in the US. Additionally, many dry shake products are not compatible with, or have limited compatibility with, conventional SCMs. Additionally, surface hardeners can only be physically applied (spread, dusted, poured) onto horizontal concrete, not vertical or inclined concrete subject to abrasion. In general, surface hardeners are only compatible with some, limited number of interior building floor projects.

Cost & Schedule: surface applied hardeners are expensive and require additional, costly specialized labour and project schedule to apply at the construction site.

Constructability & Quality Challenges: quality control of surface hardener installation is highly sensitive to skill of the applicator, construction site environmental conditions and the characteristics of the concrete mix. Additionally, application of dry shake hardeners is dusty and increases the exposure of construction workers to respirable dust.

Integral Hardener Deficiencies

Integral hardeners suffer from the following deficiencies and limitations:

Embodied Energy and Carbon: integral hardeners are standalone products added directly to the concrete mix and, according to the manufacturers, are not used as Portland cement replacement according to [C. I. Inc., *Hard-Cem: Product Usage*, Calgary: Cementec Industries Inc., 2017].

Limited Performance: integral hardeners increase concrete abrasion resistance to a limited degree.

Problematic Dosing, Handling & Use: integral hardeners are generally supplied to concrete manufacturers in heavy bags or in loose, bulk form. Concrete manufacturing plants are largely automated and not typically set up for heavy bag handling, which requires significant manual labour and effort and/or uncommon, expensive bag handling equipment. Accurate dosing of integral hardener from bags is challenging.

Alternatively, integral hardener can be sometimes supplied in loose bulk form in pneumatic tanker trucks and dosed though the automated concrete batching system. However, bulk integral hardener storage and handling requires a standalone storage tank and unloading system, which is not typically available at most concrete production facilities and is expensive to install, if there is sufficient room available.

SUMMARY OF THE INVENTION

The invention entails a method for producing a Portland cement composition from mineral raw materials comprising:

Mineral raw material derived from natural sources, industrial by-products or synthetically manufactured;

Mineral raw material that is substantially chemically inert in aqueous Portland cement environment, in which substantially chemically inert is understood to comprise that the majority (for example on the order or 90% or more) of the mineral material does not chemically react with the Portland cement during preparation of the cement composition or the subsequent preparation of concrete or mortar);

Mineral raw material that has minimum required hardness;

A mineral additive is produced by comminuting the mineral raw material to the required particle size in order to effectively increase the abrasion resistance of Portland cement, concrete or mortar and facilitate mineral additive dispersion in concrete and mortar;

The mineral additive has embodied energy less than a required or preferred limit to effectively reduce the embodied energy of Portland cement, concrete or mortar when added to the Portland cement composition;

The mineral additive has embodied carbon less than a required or preferred limit to effectively reduce the embodied carbon of Portland cement, concrete or mortar when added to the Portland cement composition;

The mineral raw material is preferably added to clinker, in the required dosage, during Portland cement production and the mineral additive is produced during the finish grinding of clinker and gypsum;

The mineral raw material is optionally comminuted separately on its own to produce the mineral additive and the mineral additive is then mixed with Portland cement in the required dosage;

The mineral raw material must be substantially dry, prior to intergrinding with clinker. The mineral additive must be substantially dry, prior to mixing with Portland cement;

Optionally, a mineral dispersing agent may be added to the mineral raw material or mineral additive during production.

The advantages of the invention are as follows:

Lower Embodied Energy and Carbon: by replacing and conserving a significant amount of energy and emission intensive clinker or Portland cement with the mineral additive, Portland cement, concrete and mortar with significantly reduced embodied energy and carbon is produced.

Increased Abrasion Resistance Performance: the mineral additive substantially increases the abrasion resistance of Portland cement, concrete or mortar past the performance limits of the conventional art.

Reduced Secondary Effects: the chemically inert mineral additive does not contribute problematic secondary effects including: increased Portland cement, concrete or mortar cracking propensity, volumetric instability, reduced workability, and rapid or slow set.

Compatibility & Versatility: the mineral additive Portland cement composition is fully compatible with interior and exterior (air entrained) concrete or mortar, conventional SCMs and horizontal, vertical or inclined concrete and mortar installations.

Improved Handling and Use During Concrete and Mortar Manufacturing: mineral additive Portland cement composition is handled in the existing Portland cement distribution, storage and dispensing systems. No additional labour or equipment is required to utilize the abrasion resistance technology over and above the established systems and equipment already in place for Portland cement.

Improved Handling and Use at the Construction Site: no additional field application labour, expertise, quality control, schedule or expense is required to utilize the mineral additive Portland cement composition.

According to one aspect of the invention there is provided a mineral additive derived from a hard mineral raw material, for use with Portland cement in formation of a cement composition, the mineral additive comprising:

the mineral additive being (i) substantially chemically inert in an aqueous Portland cement environment, (ii) substantially non-hydraulic, and (iii) substantially non-pozzolanic;

the mineral additive having a Mohs hardness of 7.0 or more; and the mineral additive comprising a particulate material having a median particle size ranging from 4 to 800 microns.

Preferably the mineral additive has a median particle size ranging from 10 to 400 microns.

When combined with the Portland cement so as to form the cement composition, preferably a mass of the mineral additive within the cement composition is 5 to 50% of a total mass of the Portland cement and the mineral additive in the cement composition.

According to a second aspect of the present invention there is provided a cement composition comprising:

Portland cement; and a mineral additive derived from a hard mineral raw material;

the mineral additive being (i) substantially chemically inert in an aqueous Portland cement environment, (ii) substantially non-hydraulic, and (iii) substantially non-pozzolanic;

the mineral additive having a Mohs hardness of 7.0 or more; and the mineral additive comprising a particulate material having a median particle size ranging from 4 to 800 microns.

Preferably a mass of the mineral additive within the cement composition is 5 to 50% of a total mass of the Portland cement and the mineral additive in the cement composition.

The cement composition may consist only of the Portland cement and the mineral additive.

The cement composition may further comprises a mineral dispersing agent comprised of a chemical which controls the pH and electrical surface charge of the mineral particles, the mineral dispersing agent having a mass that is 1 to 3% of a total mass of the Portland cement, the mineral additive and the mineral dispersing agent in the cement composition.

The hard mineral raw material may have less than or equal to 1.0% moisture by mass and may be added to Portland cement clinker prior to clinker finish grinding. In this instance, the hard mineral raw material may be comminuted with clinker and gypsum on dry basis and the mineral additive is produced during clinker finish grinding.

The hard mineral raw material may be comminuted on a dry basis separately from the Portland cement to produce the mineral additive with less than 1.0% moisture by mass, and then added to and mixed with the Portland cement subsequently to being comminuted.

The hard mineral raw material may be comminuted on a wet basis separately from the Portland cement to produce the mineral additive with less than 1.0% moisture by mass, and then added to and mixed with the Portland cement subsequently to being comminuted.

According to a further aspect of the present invention there is provided a method for producing a Portland cement composition from mineral raw materials comprising:

comminuting the mineral raw material to obtain a mineral additive such that a median particle size of the mineral additive ranges from 4 to 800 microns;

adding the mineral raw material to Portland cement prior to comminution or adding the mineral additive to Portland cement after comminution to form the Portland cement composition such that a mass of the mineral additive within the cement composition is 5 to 50% of a total mass of the Portland cement and the mineral additive in the cement composition;

sourcing the mineral raw material prior to comminution from natural sources, industrial by-products or synthetic manufacturing such that:

the mineral additive is (i) substantially chemically inert in an aqueous Portland cement environment, (ii) substantially non-hydraulic, and (iii) substantially non-pozzolanic; and the mineral additive has a Mohs hardness of 7.0 or more.

The method may further include forming the mineral additive such that the mineral additive has an embodied energy less than 4.0 GJ per tonne of mineral additive, or more preferably forming the mineral additive such that the mineral additive has an embodied energy less than 2.0 GJ per tonne of mineral additive.

The method may further include forming the mineral additive such that the mineral additive has an embodied carbon less than 0.8 tonnes $CO_2$ equivalent per tonne of mineral additive, or more preferably, forming the mineral additive such that the mineral additive has an embodied carbon less than 0.4 tonnes $CO_2$ equivalent per tonne of mineral additive.

The mineral raw material may be added to clinker, in the required dosage, during Portland cement production and the mineral additive is produced during the finish grinding of clinker and gypsum. The mineral raw material is preferably substantially dry, prior to intergrinding with the clinker.

The mineral raw material may be comminuted separately from the Portland cement to produce the mineral additive and the mineral additive is then mixed with the Portland cement in the required dosage. The mineral additive is preferably substantially dry, prior to mixing with the Portland cement.

The cement composition may further comprise a mineral dispersing agent comprised of a chemical which controls the pH and electrical surface charge of the mineral particles, the mineral dispersing agent having a mass that is 1 to 3% of a total mass of the Portland cement, the mineral additive and the mineral dispersing agent in the cement composition.

BRIEF DESCRIPTION OF THE DRAWINGS

Some embodiments of the invention will now be described in conjunction with the accompanying drawings in which:

FIG. 2 is a graph demonstrating the increase in mortar abrasion resistance over the required particle size ranges of several hard mineral additive examples, relative to increased Portland cement content.

FIG. 3 is a graph demonstrating the chemical inertness of several mineral additive examples, based on compressive strength of mortar, relative to increased Portland cement content.

FIG. 4 is a graph demonstrating the embodied energy and carbon of several mineral additive examples over the required particle size ranges.

FIG. 5 is a graph demonstrating the reduction in embodied energy and carbon of the Portland cement composition made with one example mineral additive.

FIG. 6 is a graph demonstrating the reduction in concrete embodied energy using one example mineral additive Portland cement composition.

FIG. 7 is a graph demonstrating the reduction in concrete embodied carbon using one example mineral additive Portland cement composition.

FIG. 8 is graph demonstrating the increase in mortar abrasion resistance with example mineral additive Portland cement compositions in the required particle size range, relative to two surface applied hardeners.

In the drawings like characters of reference indicate corresponding parts in the different figures.

DETAILED DESCRIPTION

Figure 1A:
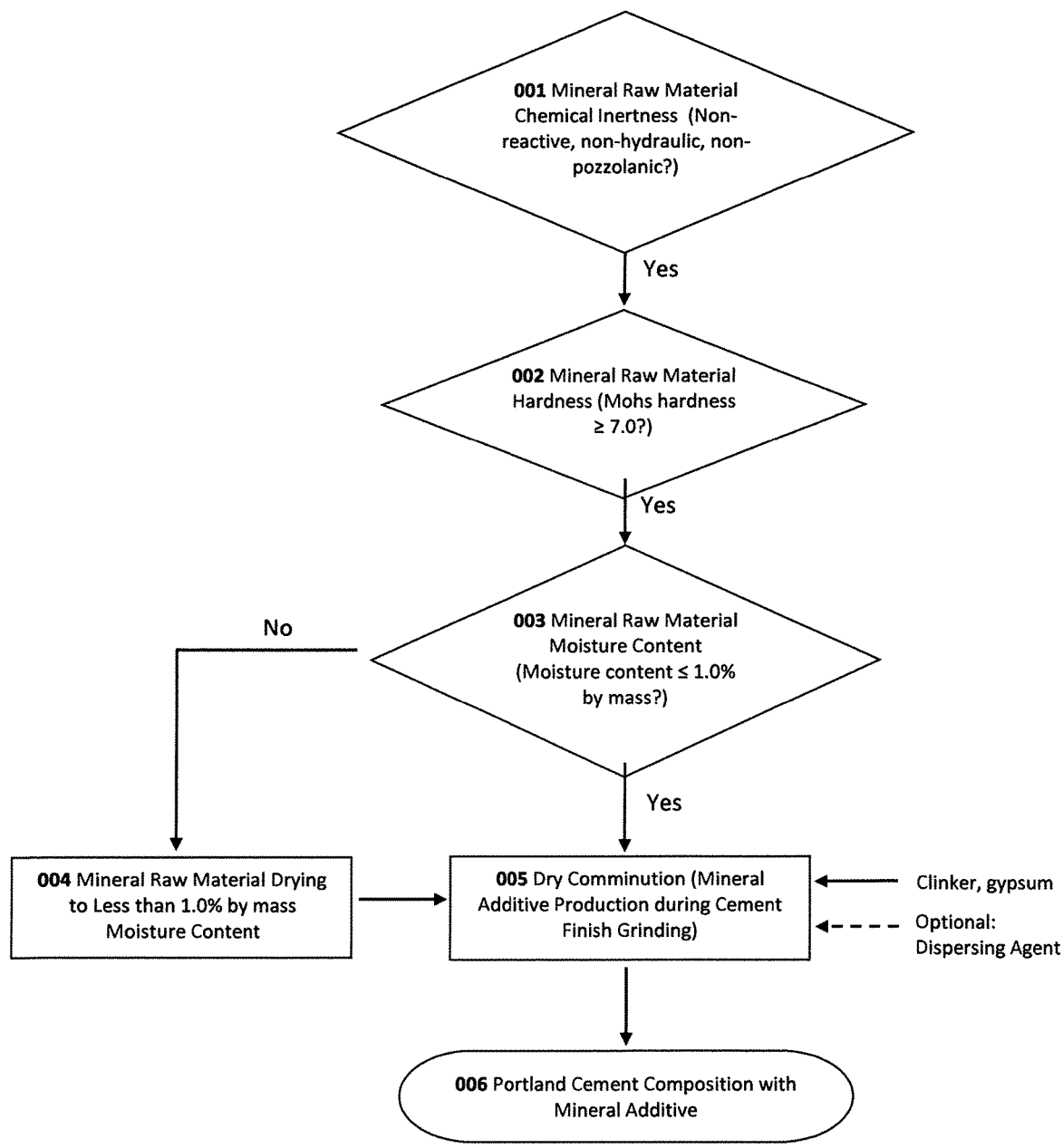
FIG. 1a is a flowchart illustrating the preferred embodiment of the invention method.

By experimentation, the inventor has determined the following:

Chemical Inertness: minerals that do not significantly chemically react in aqueous Portland cement environment, are not substantially hydraulic and are not substantially pozzolanic, are required so as not to be chemically consumed and converted into conventional CSH gel with limited abrasion resistance.

Hardness: during abrasion, chemically inert minerals with a sufficiently high hardness resist penetration of impinging materials into the concrete or mortar surface. Sufficiently hard minerals have a Mohs hardness of at least 7.0.

Particle Size: chemically inert, hard minerals must have particle size in a required and preferred range for the following reasons:

Enhanced Hardness: Minerals are conglomerates of smaller, discrete particles fused together inside coarser particles. Planes and points of weakness exist inside the conglomerates between the smaller, discrete particles that reduce the hardness of the conglomerates (i.e.: grain boundaries, pores, fissures, cracks). The mineral conglomerates must be fractured along the planes of weakness and reduced to discrete particles with sufficient hardness to effectively resist abrasion in concrete and mortar.

Dispersion: the discrete particles must be present in sufficient number and size to blend evenly among the cement particles during mixing and disperse uniformly through the cementitious material matrix to most effectively increase the abrasion resistance of Portland cement, concrete and mortar.

Embodied Energy and Carbon: comminution consumes energy and increases exponentially at very fine particle sizes, which increases the mineral additive embodied energy and carbon.

The required particle size range is 4 to 800 microns median particle size or $d_{50}$ (0.004 to 0.800 mm, or 0.00016 to 0.031 inches). The preferred particle size is 10 to 400 microns median particle size of $d_{50}$ (0.010 to 0.400 mm, or 0.0004 to 0.016 inches).

Particle Size Reduction: in the event the particles are not naturally in the required or preferred size range, comminution of the minerals by crushing or grinding is utilized. Mineral comminution to the required or preferred particle size distribution can be performed as follows:

During Cement Manufacturing (the preferred embodiment): Dry, chemically inert, hard minerals can be added to Portland cement clinker and comminuted during cement finish grinding.

Blended with Portland Cement (alternative embodiments): Alternatively, the mineral can be comminuted separately by crushing and/or grinding on a dry basis and mixed with finished Portland cement. Alternatively, the mineral can be comminuted on a wet basis, dried and then mixed with finished Portland cement.

Energy Consumption: Other than the energy required for comminution, the only other mineral processing energy required may be: low energy drying of the hard mineral before dry intergrinding with clinker or dry mixing with cement, in the event the mineral has moisture content more than 1% by mass. In contrast to clinker manufacturing, no calcination or energy intensive thermal processing of the hard minerals is required. Additional energy may also consumed during transportation of the hard mineral to the comminution facility in the event comminution is not performed at the same location as the hard mineral. Therefore, mineral additives produced will have substantially lower embodied energy and carbon than Portland cement.

Dosage: mineral additives produced in the above fashion can replace up to 50% by mass of clinker in Portland cement or 50% by mass of Portland cement in the cement composition, reducing the embodied energy and carbon and increasing the abrasion resistance of the Portland cement, concrete or mortar.

Optional Dispersing Agent: some mineral particles are prone to develop surface electrical charges that increase their propensity to agglomerate with each other or Portland cement particles, which impedes their dispersion in the concrete or mortar mixture. In such cases, it is desirable to include a dispersing agent in the Portland cement composition to facilitate dispersion of the mineral additive throughout the cementitious material matrix.

In this section, three digit reference numbers (i.e.: 004) in bold correspond to reference points on the drawings as noted.

FIG. 1a: illustrates the preferred embodiment of the invention, which comprises intergrinding the raw mineral material during Portland cement manufacturing (finish grinding) including the following elements and steps:

001, 002 Chemical Reactivity, Hardness: the mineral raw materials used must be substantially chemically inert in an aqueous Portland cement environment and have a Mohs hardness of at least 7.0.

003, 004 Moisture Content, Drying: if the mineral raw material has less than or equal to 1.0% moisture by mass, it can be directly added to clinker. If the mineral raw material has more than 1.0% moisture by mass it must be dried, prior to adding to clinker.

005 Dry Comminution: the mineral additive is produced by dry comminution during the cement finish grinding process, by intergrinding with clinker and gypsum and optionally, a dispersing agent. The mineral additive is comminuted to the required or preferred particle size range.

006 Portland Cement Composition: the final Portland cement composition contains finished Portland cement, with mineral additive in the amount of 5% to 50% by mass of the total composition.

Figure 1B:
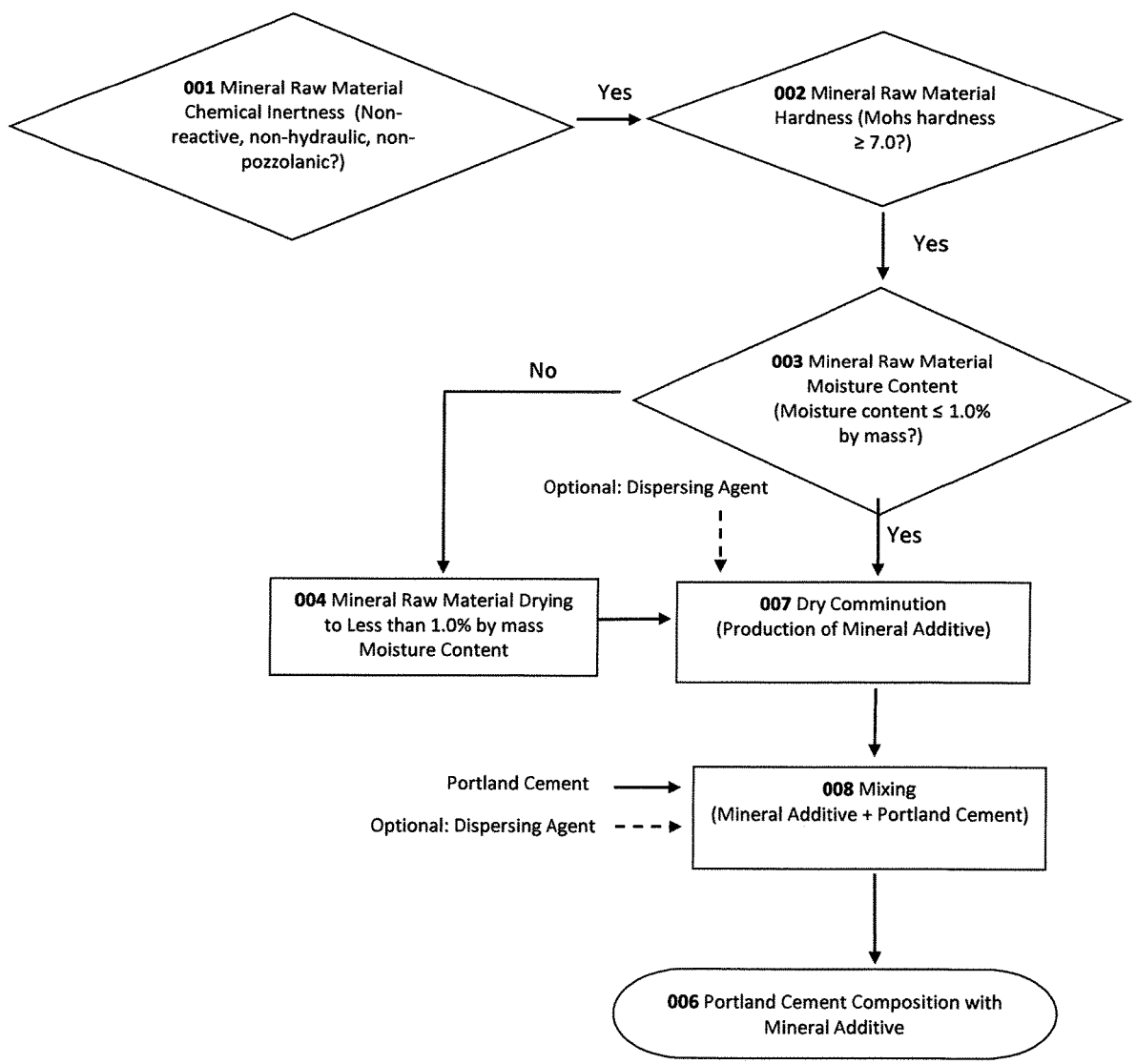
FIGS. 1b and 1c are flowcharts illustrating alternative embodiments of the invention method.

FIG. 1b illustrates an alternative embodiment of the invention, which comprises comminuting the mineral raw material separately on its own on a dry basis 007 to produce the mineral additive and mixing the mineral additive with Portland cement 008. Optionally a dispersing agent may be added during dry comminution 007 or mixing with Portland cement 008.

Figure 1C:
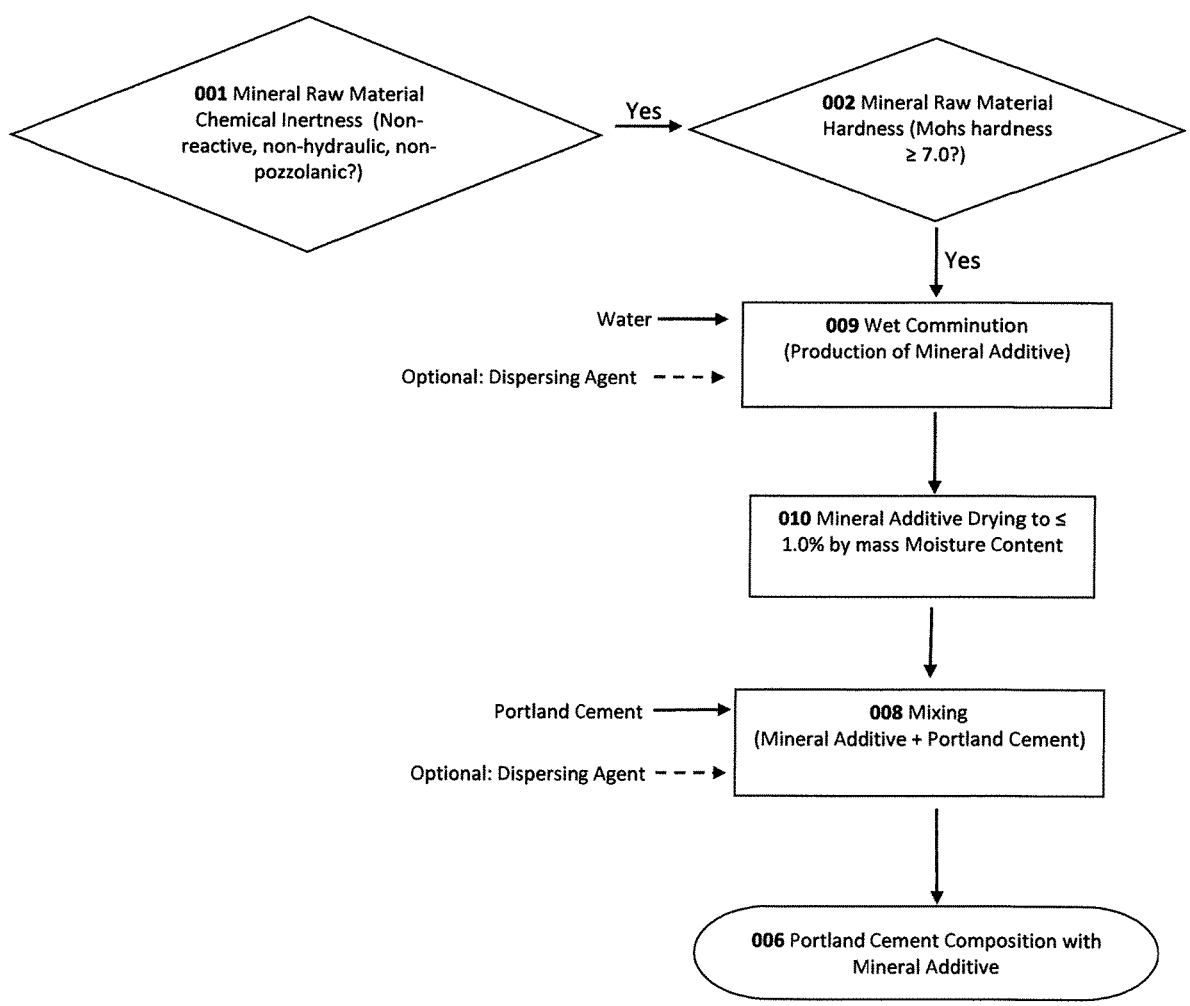

FIG. 1c illustrates an alternative embodiment of the invention, which comprises comminuting the mineral raw material separately on its own on a wet basis by forming a slurry with water to produce the mineral additive 009, drying the mineral additive to less than or equal to 1.0% by mass 010 and blending the mineral additive with Portland cement. Optionally a dispersing agent may be added during wet comminution 009 or mixing with Portland cement 008.

According to FIG. 2 example mineral raw materials were comminuted to the median particle size range shown in FIG.

2, using a 12.4 L, 0.5 hp bench scale ceramic ball mill. The following examples of mineral raw materials were comminuted as follows:

Emery (Corundite) 012: a natural mineral mixture of corundum (Mohs hardness=9.0), spinel (Mohs hardness=8.0) and magnetite (Mohs hardness=6.0). The overall hardness of emery is 8.5.

Lead-Zinc Slag 013: a granulated mineral by-product of lead and zinc metal pyrometallurgical smelting. The Mohs hardness of the lead-zinc slag is 7.0.

Nickel Slag 014: a granulated mineral by-product of nickel metal pyrometallurgical smelting. The Mohs hardness of the nickel slag is 7.0.

Copper Slag 015: a granulated mineral by-product of copper metal pyrometallurgical smelting. The Mohs hardness of the copper slag is 7.0

Natural Alluvial Sand 016: a natural mineral mixture of feldspar (Mohs hardness=6 to 6.5) and quartz (Mohs hardness=7.0). The overall hardness of the sand is 6.6.

The median comminuted particle size was measured as the equivalent spherical particle size by conventional laser diffraction. Alternatively, median particle size can be measured by conventional sieve analysis, zeta potential analysis, electric sensing zone analysis, spectroscopy, microscopy or digital image processing. The median particle size can also be estimated from the specific surface area (fineness) of the comminuted mineral, measured using conventional means such as air permeability measurement (i.e.: Blaine fineness) or inert gas adsorption (i.e.: Brunauer-Emmett-Teller (BET) fineness.)

On average, concrete mixtures will contain on the order of 250 to 300 kg of Portland cement per $m^3$ of concrete. A control mortar mixture (with no mineral additive) was established by removing the coarse aggregate from a concrete mixture with approximately 290 kgs of Portland cement per $m^3$ of concrete. Mortar, with no coarse aggregate, comprises the outermost surface of the concrete initially exposed to abrasion in construction applications. The control mixture had the following proportions:

Conventional Portland cement: 645 kg/$m^3$ of mortar.
Sand: 1,377 kg/$m^3$ of mortar.
Water: 253 kg/$m^3$ of mortar.
Water Reducing Admixture: polycarboxylate high range water reducer at 0.4% by mass of Portland cement composition.

Comminuted mineral additives were mixed with Portland cement in the proportions of 80% Portland cement and 20% mineral additive by mass and the mineral additive Portland cement composition was used to make mortar test mixes with the following proportions:

Test Portland Cement Compositions: 645 kg/$m^3$ of mortar (516 kg Portland cement, 129 kg mineral additive.)
Sand: ranged from 1,359 to 1,393 kg/$m^3$ of mortar to yield equivalent mix volume.
Water: 253 kg/$m^3$ of mortar.
Water Reducer Admixture: polycarboxylate high range water reducer at 0.3% to 0.4% by mass of Portland cement composition, varied as required to maintain mortar workability within 20% of control mixture.

Mortar test specimens measuring 102 mm wide×102 mm long×16 mm thick (4-inch×4-inch×0.625 inch) were cast from each mixture, given a smooth steel trowel finish by hand, wet cured at 15 to 20° C. (59 to 68° F.) for 26 days and air cured for 2 days, prior to abrasion resistance testing.

Abrasion resistance of mortar test specimens was tested with a rotary platform abraser consistent with ASTM C1803-15: Standard Guide for the Abrasion Resistance of Mortar Surfaces Using a Rotary Platform Abraser as this test method directly tests the abrasion resistance of the mortar, which comprises the outermost concrete surface. The abrasion resistance of concrete can also be measured utilizing any standard procedure including: ASTM C 418 Standard Test Method for the Abrasion Resistance of Concrete by Sandblasting, ASTM C 779 Standard Test Method for Abrasion Resistance of Horizontal Concrete Surfaces (Procedures A, B or C), ASTM C 944/944M Standard Test Method for Abrasion Resistance of Concrete or Mortar Surfaces by the Rotating-Cutter Method, ASTM C 1138M Standard Test Method for the Abrasion Resistance of Concrete (Underwater Method), ASTM C627: Standard Test Method for Evaluating Ceramic Floor Tile Installation Systems Using the Robinson-Type Floor Tester (modified for concrete abrasion resistance testing), BS EN 13892-4 Methods of test for Screed materials—Part 4: Determination of Wear Resistance-BCA (standard test method in the United Kingdom), or DIN 52108 Testing of Inorganic Non-Metallic Materials—Wear test Using the Grinding Wheel According to Boehme—Grinding Wheel Method (standard test method in Germany.)

The relative change (% increase or decrease) in test specimen abrasion resistance is calculated relative to the control specimen based on the abrasive wear measured by any of the above tests. Abrasive wear may be measured as the specimen mass loss, depth of wear, volume of wear or rate of wear over the duration of the test, as per the standard test methodology. The change in test specimen abrasion resistance relative to the control is calculated as follows:

$$\text{Relative Abrasion Resistance Change} = \frac{AWcontrol}{AWtest} - 1$$

Where AW=the abrasive wear measured during the test.

As seen in FIG. 2, alluvial sand 016 with a Mohs hardness less than 7.0 cannot replace Portland cement without reducing mortar abrasion resistance, relative to the control mixture with 20% more Portland cement. Minerals with Mohs hardness of 7.0 or more replaced 20% of Portland cement by mass and significantly increased mortar abrasion resistance when comminuted to the required particle size range 017 of 4 to 800 microns median particle size $d_{50}$ (0.004 to 0.800 mm, or 0.00016 to 0.031 inches).

The preferred particle size range 018 is 10 to 400 microns (0.010 to 0.400 mm, or 0.0004 to 0.016 inches) median particle size ($d_{50}$), which encompasses the optimum performance range that yields mineral additives with lower embodied energy and carbon (see FIG. 4) and high abrasion resistance performance (see FIG. 2).

FIG. 3 demonstrates the substantial chemical inertness of the mineral additives in the required and preferred particle size range with example mineral additives derived from lead-zinc slag 019, copper slag 020, emery 021 and alluvial sand 022. Relative to the control mixture with 20% more Portland cement by mass, the mineral additives in the required particle size range do not demonstrate significant hydraulic or pozzolanic reactivity contributing to mortar compressive strength development.

FIG. 4 demonstrates the embodied energy and carbon of example mineral additives produced to the required and preferred median particle size range. The embodied energy is determined as follows:

Comminution Energy: is the shaft power of the full scale comminution energy input per unit mass of mineral raw material comminuted. In FIG. 4, for example: shaft power is determined by measuring the electric motor current draw and voltage of a 12.4 litre, 0.5 hp bench scale ball mill, calculating shaft power by conventional means, then multiplying the shaft power by the grinding time and dividing by the mass of material comminuted in kilograms. The full scale grinding energy is calculated by multiplying the bench scale comminution energy by a correlation coefficient, which has been determined by the inventor to correlate with full scale grinding energy consumption based on experience and experimentation. Other conventional means of measuring comminution energy are also suitable.

Transportation Energy: In FIG. 4, for example: mineral raw material transportation by diesel dump truck over a distance of 300 km (186 miles) is assumed. According to Portland Cement Association, a diesel dump truck will consume approximately 338 KJ/tonne.km according to [M. Marceau, M. Nisbet and M. VanGeem, "Life Cyle Inventory of Portland Cement Manufacture," Portland Cement Association, Skokie, Ill., 2006]. The transportation fuel energy consumption is estimated at 0.1 GJ/tonne.

Drying Energy: the mineral raw material has less than 1.0% moisture content by mass and drying energy consumption is not required.

As seen in FIG. 4 example mineral additives produced to the required particle size range have less embodied energy than Portland cement 023. Example minerals produced to the preferred particle size range have substantially less embodied energy than Portland cement (less than approximately 25% of embodied energy.)

The mineral additive embodied carbon is determined as follows:

Electricity GHG Emissions: According to Canada's National Energy Board, electricity generation in the Canadian Province of Alberta emits on average, 790 g of $CO_2$/kW.h ($\approx$231 kg of $CO_2$ eq per GJ) according to [NEB, "NEB—Canada's Renewable Power," 2019. (Online). Available: https://www.neb-one.gc.ca/nrg/sttstc/lctrct/rprt/2017cndrnwblpwr/ghgmssn-eng.html?=undefined&wbdisable=true. (Accessed 13 Jan. 2019)]. Alberta's power supply is primarily coal fired and has the highest GHG emission intensity in Canada. In FIG. 4, the electrical power consumption during comminution is multiplied by the emission intensity of local power production.

Transportation Emissions: According to the US Energy Information Administration, diesel fuel combustion emits 161.3 lbs of $CO_2$/MBtu ($\approx$73 kg $CO_2$ eq per GJ) according to [EIA, "How much carbon dioxide is produced when different fuels are burned?," 2019. (Online). Available: https://www.eia.gov/tools/faqs/faq.php?id=73&t=11. (Accessed 13 January 2019)]. In FIG. 4 the diesel emissions during transportation are calculated as 0.0074 tonnes of $CO_2$ eq per tonne of mineral additive.

As seen in FIG. 4, the embodied carbon of the example mineral additives produced to the required particle size range is less than Portland cement 023. Example minerals additives produced to the preferred particle size range have substantially lower embodied carbon than Portland cement (less than approximately 25% of embodied carbon.)

FIG. 5 demonstrates the reduction of the Portland cement composition (Portland cement plus mineral additive) embodied energy relative to the amount of Portland cement replaced by an example mineral additive produced by comminuting nickel slag to a median particle size of 100 microns. At 20% Portland cement mass replacement by hard mineral 025, the embodied energy is reduced to 3.85 GJ/tonne, which is approximately 20% lower than Portland cement on its own. At 50% Portland cement mass replacement, the blended cement embodied energy is reduced to 2.47 GJ/tonne, which is approximately 49% lower than Portland cement on its own.

FIG. 5 also demonstrates the reduction of the Portland cement composition (Portland cement plus mineral additive) embodied carbon relative to the amount of Portland cement replaced by an example mineral additive produced by comminuting nickel slag to a median particle size of 100 microns. At 20% Portland cement mass replacement by hard mineral 026, the embodied carbon is reduced to 0.75 tonnes of $CO_2$ eq per tonne of binder, which approximately 20% lower than Portland cement on its own. At 50% Portland cement mass replacement, the binder embodied carbon is reduced to 0.47 tonnes of $CO_2$ eq per tonne of binder, which is approximately 49% lower than Portland cement on its own.

FIG. 6 demonstrates the reduction of the embodied energy of concrete containing the Portland cement composition with an example mineral additive produced by comminuting nickel slag to a median particle size of 100 microns. Concrete with a typical cement content of 275 kg/m$^3$ of concrete 027, with 15% Portland cement by mass replaced mineral additive has an embodied energy of 1.18 GJ/m$^3$, which is approximately 14% lower than concrete without mineral additive. At 50% replacement of Portland cement with mineral additive, the embodied energy of the concrete is 0.74 GJ/m$^3$, which is approximately 47% lower than concrete without mineral additive.

FIG. 7 demonstrates the reduction of the embodied carbon of concrete the Portland cement composition with an example mineral additive produced by comminuting nickel slag to a median particle size of 100 microns. Concrete with a typical cement content of 275 kg/m$^3$ of concrete 028, with 15% Portland cement by mass replaced by mineral additive has embodied carbon of 0.225 tonnes of $CO_2$ eq per m$^3$ of concrete, which is approximately 14% lower than concrete without mineral additive. At 50% replacement of Portland cement with mineral additive, the embodied carbon of the concrete is 0.14 tonnes of $CO_2$ eq per m$^3$ of concrete, which is approximately 46% lower than concrete without mineral additive.

FIG. 8 demonstrates the effectiveness of the Portland cement composition with example mineral additives, relative to dry shake surface hardeners. The premium dry shake hardener 034 is significantly more expensive than the economy dry shake hardener 033 and is intended for heavy duty abrasion applications. At the manufacturer recommended dosage (1 lb/ft$^2$ of area), the dry shake hardeners were mixed with the control mortar mix in equal parts by mass, consistent with the practice of working the product into the surface of concrete flatwork mortar. As seen in FIG. 8, the Portland cement compositions with emery 029, lead-zinc slag 030 and nickel slag 031 mineral additives exhibited at least the same, to more typically, substantially higher mortar abrasion resistance as surface applied hardeners, while replacing 20% of the mortar Portland cement by mass, compared to no Portland cement replaced by the surface applied hardener. Additionally, the mineral additive Portland cement compositions are more versatile, compatible and requires no field application labour and schedule. As seen in FIG. 8, alluvial sand 032 does not have sufficient hardness to replace cement and increase mortar abrasion resistance.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method for producing a Portland cement composition comprising:
   providing a mineral additive derived from a mineral raw material;
   combining the mineral additive with Portland cement to form the cement composition such that a mass of the mineral additive within the cement composition is 5 to 50% of a total mass of the Portland cement and the mineral additive in the cement composition;
   wherein the mineral additive is (i) substantially chemically inert in an aqueous Portland cement environment, (ii) substantially non-hydraulic, and (iii) substantially non-pozzolanic;
   wherein the mineral additive has a Mohs hardness of 7.0 or more;
   wherein the mineral additive comprises a particulate material having a suitable median particle size within the range of 4 to 800 microns;
   wherein the mineral additive excludes quartz; and
   wherein the cement composition consists only of the Portland cement and the mineral additive.

2. The method according to claim 1 wherein the mineral raw material is comminuted on a dry basis separately from the Portland cement to produce the mineral additive, and the mineral additive is added to and mixed with the Portland cement subsequently to being comminuted.

3. The method according to claim 1 wherein the mineral raw material is comminuted on a wet basis separately from the Portland cement to produce the mineral additive, the mineral additive is dried, and the mineral additive is added to and mixed with the Portland cement subsequently to being comminuted and dried.

4. The method according to claim 1 further comprising:
   sourcing the mineral raw material prior to comminution from natural sources, industrial by-products or synthetic manufacturing;
   comminuting the mineral raw material to obtain the mineral additive by:
   (a) adding the mineral raw material to Portland cement prior to comminution such that a mass of the mineral additive within the cement composition is 5 to 50% of a total mass of the Portland cement and the mineral additive in the cement composition; or
   (b) adding the mineral additive to Portland cement after comminution to form the Portland cement composition such that a mass of the mineral additive within the cement composition is 5 to 50% of a total mass of the Portland cement and the mineral additive in the cement composition.

5. The method according to claim 4 including forming the mineral additive such that the mineral additive has an embodied energy less than 4.0 GJ per tonne of mineral additive.

6. The method according to claim 4 including forming the mineral additive such that the mineral additive has an embodied energy less than 2.0 GJ per tonne of mineral additive.

7. The method according to claim 4 including forming the mineral additive such that the mineral additive has an embodied carbon less than 0.8 tonnes $CO_2$ equivalent per tonne of mineral additive.

8. The method according to claim 4 including forming the mineral additive such that the mineral additive has an embodied carbon less than 0.4 tonnes $CO_2$ equivalent per tonne of mineral additive.

9. The method according to claim 4 wherein the mineral raw material is added to clinker during Portland cement production and the mineral additive is produced during the finish grinding of clinker and gypsum.

10. The method according to claim 9 wherein the mineral raw material is substantially dry, prior to intergrinding with the clinker.

11. The method according to claim 4 wherein the mineral raw material is comminuted separately from the Portland cement to produce the mineral additive and the mineral additive is then mixed with the Portland cement.

12. The method according to claim 11 wherein the mineral additive is substantially dry, prior to mixing with the Portland cement.

13. The method according to claim 4 including sourcing the mineral raw material from natural sources.

14. The method according to claim 4 including sourcing the mineral raw material from industrial by-products.

15. The method according to claim 4 including sourcing the mineral raw material from synthetic manufacturing.

16. A method for producing a Portland cement composition comprising:
   providing a mineral additive derived from a mineral raw material;
   providing a dispersing agent comprised of a chemical which controls a pH and an electrical surface charge of mineral particles of the mineral additive; and
   combining the mineral additive with Portland cement and the dispersing agent to form the cement composition;
   wherein a mass of the mineral additive within the cement composition is 5 to 50% of a total mass of the Portland cement and the mineral additive in the cement composition;
   wherein a mass of the dispersing agent is 1 to 3% of a total mass of the Portland cement, the mineral additive and the dispersing agent in the cement composition;
   wherein the mineral additive is (i) substantially chemically inert in an aqueous Portland cement environment, (ii) substantially non-hydraulic, and (iii) substantially non-pozzolanic;
   wherein the mineral additive has a Mohs hardness of 7.0 or more;
   wherein the mineral additive comprises a particulate material having a suitable median particle size within the range of 4 to 800 microns;
   wherein the mineral additive excludes quartz; and
   wherein the cement composition consists only of the Portland cement, the mineral additive, and the dispersing agent.

17. The method according to claim 16 including combining the mineral additive with the Portland cement to form the cement composition by adding the mineral raw material to a Portland cement clinker prior to clinker finish grinding the Portland cement clinker into the Portland cement, the mineral raw material being comminuted with the Portland cement clinker and gypsum on dry basis such that the mineral additive is produced during the clinker finish grinding.

* * * * *